(12) United States Patent
Megerian et al.

(10) Patent No.: US 9,846,738 B2
(45) Date of Patent: Dec. 19, 2017

(54) DYNAMIC FILTER OPTIMIZATION IN DEEP QUESTION ANSWERING SYSTEMS

(71) Applicant: International Business Machines Corporation, Armonk, NY (US)

(72) Inventors: Mark G. Megerian, Rochester, MN (US); Brian R. Muras, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 365 days.

(21) Appl. No.: 14/561,417

(22) Filed: Dec. 5, 2014

(65) Prior Publication Data

US 2016/0162581 A1 Jun. 9, 2016

(51) Int. Cl.
*G06F 17/30* (2006.01)
*G06N 5/04* (2006.01)

(52) U.S. Cl.
CPC ......... *G06F 17/30654* (2013.01); *G06N 5/04* (2013.01)

(58) Field of Classification Search
CPC ....................... G06F 17/30654; G06N 5/04
See application file for complete search history.

(56) References Cited

U.S. PATENT DOCUMENTS

| 7,269,545 | B2 | 9/2007 | Agichtein et al. | |
|---|---|---|---|---|
| 2008/0154833 | A1* | 6/2008 | Jessus | G06N 7/005 706/47 |
| 2010/0332507 | A1* | 12/2010 | Saadat | G06Q 30/0251 707/759 |
| 2011/0252031 | A1* | 10/2011 | Blumenthal | G06F 17/30864 707/733 |
| 2012/0078636 | A1* | 3/2012 | Ferrucci | G06F 17/30654 704/270.1 |
| 2012/0078889 | A1* | 3/2012 | Chu-Carroll | G06F 17/30654 707/723 |
| 2012/0191716 | A1 | 7/2012 | Omoigui | |
| 2013/0007037 | A1* | 1/2013 | Azzam | G06F 17/30654 707/769 |
| 2013/0198116 | A1* | 8/2013 | Bhamidipaty | H04L 41/5074 706/12 |
| 2014/0149446 | A1 | 5/2014 | Kuchmann-Beauger et al. | |

(Continued)

OTHER PUBLICATIONS

Dumais et al. "Web Question Answering: Is More Always Better?", Proceedings of the 25th Annual International ACM SIGIR Conference on Research and Development in Information Retrieval, ACM, 2002.

(Continued)

*Primary Examiner* — Jorge A Casanova
(74) *Attorney, Agent, or Firm* — Patterson + Sheridan, LLP

(57) ABSTRACT

Systems, methods, and computer program products to perform an operation comprising providing a plurality of filters in a deep question answering (deep QA) system, wherein each of the filters is configured to remove candidate answers not meeting a set of criteria of each respective filter from further consideration by the deep QA system, determining that a first ordering, of a plurality of orderings of the plurality of filters, is an optimal ordering of the plurality of filters based on a respective filtering metric of each ordering, and configuring the deep QA system to apply the plurality of filters to candidate answers according to the first ordering.

17 Claims, 3 Drawing Sheets

(56) References Cited

U.S. PATENT DOCUMENTS

2014/0164303 A1    6/2014   Bagchi et al.
2014/0250138 A1*   9/2014   Friling ............... H04L 41/0604
                                                                          707/754
2014/0258211 A1    9/2014   Hatami-Hanza

OTHER PUBLICATIONS

Fleischman et al., "Offline Strategies for Online Question Answering: Answering Questions Before They Are Asked," Proceedings of the 41st Annual Meeting on Association for Computational Linguistics, vol. 1, Association for Computational Linguistics, 2003.

Cardie et al., "Examining the Role of Statistical and Linguistic Knowledge Sources in a General-Knowledge Question-Answering System," Proceedings ANLC '00 Proceedings of the Sixth Conference on Applied Natural Language Processing, pp. 180-187 Association for Computational Linguistics Stroudsburg, PA, USA © 2000.

Lin et al., "Question Answering from the Web Using Knowledge Annotation and Knowledge Mining Techniques," Proceedings of the Twelfth International Conference on Information and Knowledge Management, ACM, 2003.

* cited by examiner

DYNAMIC FILTER OPTIMIZATION IN DEEP QUESTION ANSWERING SYSTEMS

BACKGROUND

The present disclosure relates to deep question answering systems, and more specifically, to dynamic filter optimization in deep question answering systems.

Deep question answering systems process questions using a pipeline of very detailed and complex algorithms. One part of the pipeline is candidate answer filtering, where different filters are used to discard candidate answers that do not satisfy the filter criteria. Deep question answering systems spend much time and computing resources filtering the candidate answers, as developers typically order filters arbitrarily at development time. Furthermore, the optimal ordering of filters may change over time, or may change based on the questions being asked, or may change based on the corpus being leveraged by the deep question answering system.

SUMMARY

Embodiments disclosed herein provide systems, methods, and computer program products to perform an operation comprising providing a plurality of filters in a deep question answering (deep QA) system, wherein each of the filters is configured to remove candidate answers not meeting a set of criteria of each respective filter from further consideration by the deep QA system, determining that a first ordering, of a plurality of orderings of the plurality of filters, is an optimal ordering of the plurality of filters based on a respective filtering metric of each ordering, and configuring the deep QA system to apply the plurality of filters to candidate answers according to the first ordering.

DETAILED DESCRIPTION

Embodiments disclosed herein improve performance of deep question answering (deep QA) systems by optimizing the ordering of multiple filters that are applied to candidate answers processed by the deep QA systems. Filters are generally used to keep or discard candidate answers generated by the deep QA system in a processing pipeline. For example, if a candidate answer does not meet the filter criteria, the deep QA system may discard the candidate answer. Generally, embodiments disclosed herein consider the time and/or resources spent in applying the filters and the historical selectivity of filters to reorder the filters into an optimal configuration for processing future candidate answers.

Generally, from a performance perspective, the earlier that the deep QA system can filter (or discard) a candidate answer not meeting the filter criteria, the better. For example, if filter A does not discard a first candidate answer, but filter B subsequently discards the first candidate answer, resources were wasted in applying filter A to the first candidate answer. By optimizing the ordering of the filters (for example, by first applying filter B and then applying filter A), the deep QA system may minimize the amount of computing resources wasted on processing candidate answers only to discard them later. As used herein, an "optimal ordering" (also referred to as an "optimized ordering") of filters refers to an ordering of filters that provides the most efficient filtering of candidate answers from a processing standpoint relative to all other orderings of filters. The most efficient filtering may be based on an amount of time spent applying the filters and/or an amount of system resources spent applying the filters.

As such, embodiments disclosed herein configure the deep QA system to apply an optimal ordering of filters. Doing so may allow the deep QA system to first apply the more selective filters, and therefore discard candidate answers with minimal computing resources. Doing so may minimize the total amount of time and/or resources the deep QA system spends applying all filters to the candidate answers, enabling the deep QA system to return responses to users more quickly. Furthermore, the deep QA system may be configured to periodically refine the optimal ordering of filters, as well as maintain different optimal orderings that are specific to questions, question types, and/or the corpus being used by the deep QA system.

Figure 1:
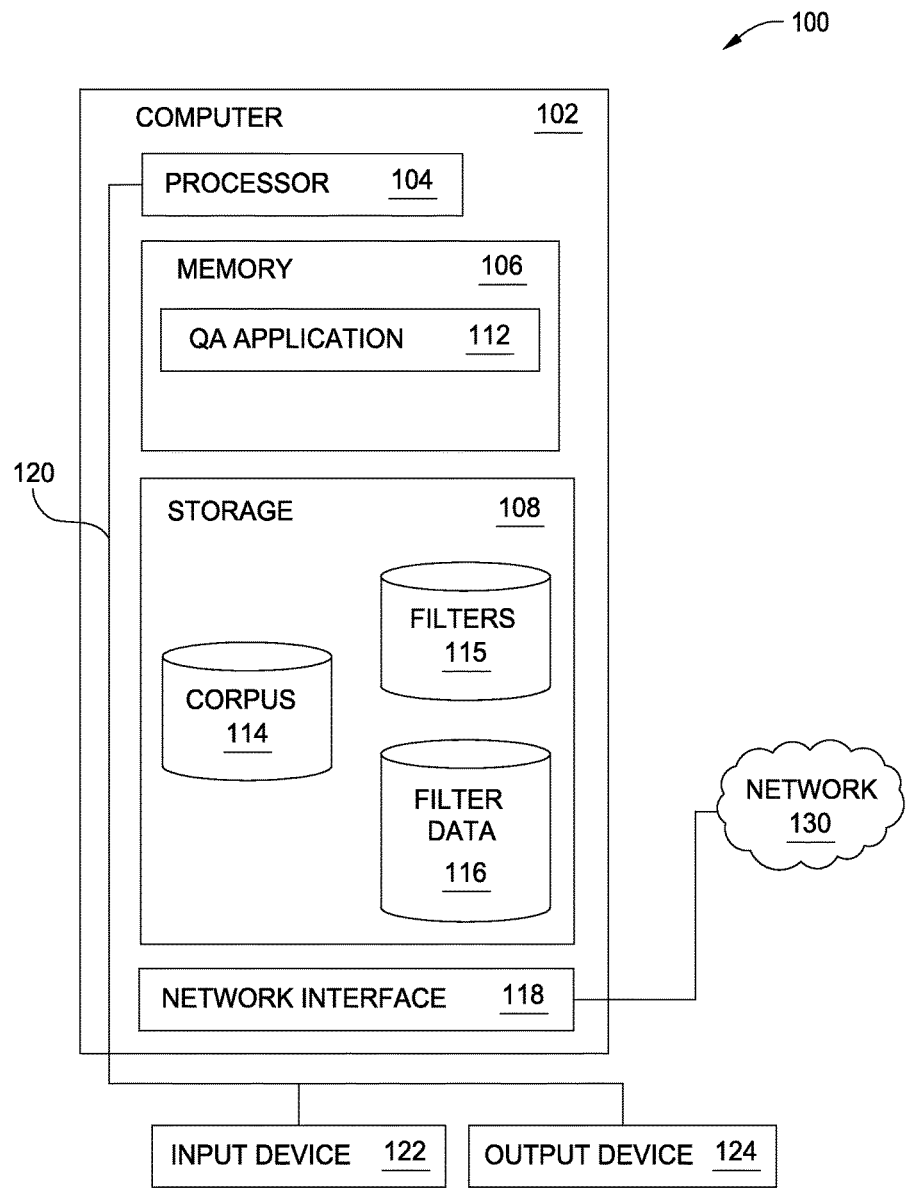
FIG. 1 illustrates a system which provides dynamic filter optimization in deep question answering systems, according to one embodiment.

FIG. 1 illustrates a system 100 which provides dynamic filter optimization in deep question answering systems, according to one embodiment. The networked system 100 includes a computer 102. The computer 102 may also be connected to other computers via a network 130. In general, the network 130 may be a telecommunications network and/or a wide area network (WAN). In a particular embodiment, the network 130 is the Internet.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as monitors, touch screen displays, and so on.

As shown, the memory 106 contains a QA application 112, which is an application generally configured to provide a deep question answering (QA) system. One example of a deep question answering system is Watson, by the IBM Corporation of Armonk, N.Y. A user may submit a case (also referred to as a question) to the QA application 112. The QA application 112 will then provide an answer to the case based on an analysis of a corpus of information 114. The QA application 112 may analyze the case to identify concepts in the case. Based on the questions, the QA application 112 may generate a number of candidate answers that are potential responses to the case. The QA application 112 may then score the candidate answers, and apply a number of filters from a filter store 115 to the candidate answers to discard candidate answers that do not meet the filter criteria. The QA application 112 may then find supporting evidence for the filtered candidate answers. The QA application 112 may then score the supporting evidence, merge the results, and present the best answer as its response to the case.

In addition, the QA application 112 is configured to ensure that an optimized ordering of the filters in the filters 115 is applied to each case. The ordering may be optimized in that the performance of the QA application 112 in applying the filters is optimized relative to a default (or current) ordering. The QA application 112 may be configured to apply different orderings of filters to different cases. The QA application 112 may further monitor the application of the different orderings of filters to determine how each filter (and ordering of filters) performs in terms of selectivity, runtime, and consumption of system resources. Over time, the QA application 112 may periodically modify the ordering of filters such that an optimized ordering of filters is applied to candidate answers, thereby reducing the amount of time required to filter candidate answers (and providing higher selectivity earlier in the filter application process). In addition to periodically modifying the ordering of filters, the QA application 112 may modify the ordering of filters responsive to specific events, such as changes in the corpus 114, changes to the filters themselves, and the like.

For example, consider three example filters, F1, F2, and F3, described in Table I:

TABLE I

| Filter | Runtime (in seconds) | System RAM utilization (in gigabytes) | Selectivity (% of candidate answers kept by filter) |
|---|---|---|---|
| F1 | 10 | 10G | 90% |
| F2 | 10 | 10G | 30% |
| F3 | 1 | 1G | 50% |

As shown, filter F1 has a runtime of 10 seconds, utilizes 10 gigabytes of system random access memory (RAM), and keeps 90% of the candidate answers, while discarding 10% of candidate answers. Filter F2 also has a 10 second runtime and utilizes 10 gigabytes of RAM, but keeps 30% of candidate answers while discarding 70% of candidate answers. Filter F3 has a runtime of one second, utilizes one gigabyte of RAM, and retains 50% of candidate answers while discarding 50% of candidate answers. Although system RAM is used as an example system resource, embodiments disclosed herein may consider any computing resource when determining an optimal ordering. Example system resources include, without limitation, CPU cycles/time, RAM storage, disk storage, network Bandwidth, number of IOs, number of threads, and the like. Although the runtime of the filters is shown as static for each filter, some filters may have dynamic runtime requirements (such as those filters having runtimes dependent on the length of a passage used as input to the filter). Therefore, the runtime requirement for these dynamic filters may change on any given invocation of the filter. The use of static filters in Table I should not be considered limiting of the disclosure. Similarly, the use of seconds should not be considered limiting of the disclosure, as filters may take any amount of time to execute. Furthermore, the QA application 112 may be configured to apply any number of filters to candidate answers, and the use of three filters should not be considered limiting of the disclosure.

Table II depicts example data collected by the QA application 112 when the QA application 112 runs 1,000 candidate answers are through the filters F1, F2, and F3.

TABLE II

| Filter Order | First Time Period | Second Time Period | Third Time Period | Candidate Answers Kept After Filtering | Total Time Spent Filtering | Total RAM Utilized During Filtering |
|---|---|---|---|---|---|---|
| F1->F2->F3 | 1000 @ F1 = 10000 Sec | 900 @ F2 = 9000 Sec | 270 @F3 = 270 Sec | 135 | 10000 + 9000 + 270 = 19270 Sec | 19270 GB |
| F1->F3->F2 | 1000 @ F1 = 10000 Sec | 900 @ F3 = 900 Sec | 450 @ F2 = 1500 Sec | 135 | 10000 + 900 + 1500 = 12400 Sec | 12400 GB |
| F2->F1->F3 | 1000 @ F2 = 10000 Sec | 300 @ F1 = 3000 Sec | 270 @ F3 = 270 Sec | 135 | 10000 + 3000 + 270 = 13270 Sec | 13270 GB |
| F2->F3->F1 | 1000 @ F2 = 10000 Sec | 300 @ F3 = 300 Sec | 150 @ F1 = 1500 Sec | 135 | 10000 + 300 + 1500 = 11800 Sec | 11800 GB |
| F3->F1->F2 | 1000 @ F3 = 1000 Sec | 500 @ F1 = 5000 Sec | 450 @ F2 = 4500 Sec | 135 | 1000 + 5000 + 4500 = 10500 Sec | 10500 GB |
| F3->F2->F1 | 1000 @ F3 = 1000 Sec | 500 @ F2 = 5000 Sec | 150 @ F1 = 1500 Sec | 135 | 1000 + 5000 + 1500 = 7500 Sec | 7500 GB |

Table II reflects all permutations of the filters F1, F2, and F3, namely six different orderings of the filters that the QA application 112 may use to filter the different candidate answers. Each column for the first, second, and third time periods reflects how long the respective filter in the filter ordering took to process candidate answers, as well as how many candidate answers were ran through each filter. As shown, the total number of candidate answers retained is the same for each permutation, however, the second and third time periods reflect different numbers of candidate answers being filtered (due to the different selectivity of the prior filters). For example, filter F3 in the F1->F2->F3 ordering was applied to 270 candidate answers, while filter F3 was applied to 900 candidate answers in the F1->F3->F2 ordering.

As shown, the "Total Time Spent Filtering" column of Table II reflects the total run time of each ordering of the filters F1, F2, F3. For example, the F1->F3->F2 ordering required 12,400 seconds to apply each filter, while the F3->F1->F2 ordering required 10,500 seconds to apply each filter. However, the F3->F2->F1 ordering took the least amount of time to apply each filter at 7,500 seconds. Therefore, the QA application 112 may determine that the F3->F2->F1 filter ordering is the optimal ordering. The QA application 112 may store an indication that the F3->F2->F1 filter ordering is the optimal ordering based on total time in the filters 115. The QA application 112 may further associate the optimal ordering with a question, a class of questions, or a specific corpus 114 that is being used by the QA application 112 to process questions.

Similarly, the "Total RAM Utilized During Filtering" column of Table II reflects the total RAM utilized in applying each ordering of the filters F1, F2, F3. For example, the F1->F3->F2 ordering utilized 12,400 GB of RAM to apply each filter, while the F3->F1->F2 ordering required 10,500 GB of RAM in applying each filter. However, the F3->F2->F1 ordering utilized the least amount of RAM to apply each filter, namely 7,500 gigabytes. Therefore, the QA application 112 may determine that the F3->F2->F1 filter ordering is the optimal ordering based on the amount of system RAM utilized during the filtering. The QA application 112 may then store an indication that the F3->F2->F1 filter ordering is the optimal ordering based on system resource utilization (RAM) in the filters 115. In at least one embodiment, the QA application 112 may consider more than one attribute in determining an optimal ordering, such as RAM utilization, CPU utilization, and total time spent applying the filters.

In at least one embodiment, the QA application 112 may store the data (and other data) of Tables I and II in the filter data 116. Doing so may allow the QA application 112 to modify the optimal orderings of filters over time. For example, the QA application 112 may periodically monitor the processing of different questions to determine which candidate answer filter ordering is optimal, as the optimal ordering of filters may change over time. The QA application 112 may sample all orderings of filters, or a subset of the different orderings (such as the subset estimated to be the best orderings), and collect runtime and filtering data related to each sampled ordering of filters. Based on the collected data, the QA application 112 may then select an optimal ordering (which may or may not be the current optimal ordering). In at least one embodiment, the QA application 112 may select a new optimal ordering only if the new optimal ordering offers a threshold improvement over the current optimal ordering. For example, if the current optimal ordering has an average runtime of 10 seconds, and the threshold is 5%, then the QA application 112 must determine that the new ordering has an average runtime that is at least 0.5 seconds faster than the 10 second runtime of the current optimal ordering before selecting the new ordering as the optimal ordering.

As shown, the storage 108 includes a corpus 114, a filters 115, and a filter data 116. The corpus 114 is a body of information used by the QA application 112 to generate answers to questions (also referred to as cases). For example, the corpus 114 may contain scholarly articles, dictionary definitions, encyclopedia references, and the like. The filters 115 include a plurality of different filters specifying criteria that are used to keep or discard candidate answers generated by the QA application 112. Examples of filters include, without limitation, word count filters, text analysis filters, relevancy filters, accessibility filters, and the like. For example, a word count filter may specify a maximum or minimum word count that a candidate answer must satisfy. If the maximum word count is 50 words, the word count filter would filter any candidate answers having more than 50 words. An example text analysis filter may require the presence of specific concepts in a candidate answer. If the candidate answer does not include the specified concepts, the text analysis filter would discard the candidate answer. An accessibility filter may filter out any candidate answers requiring supporting evidence that is not accessible (due to, for example, copyright permissions).

The filter data 116 includes data reflecting different metrics collected by the QA application 112 when applying different orderings of filters to candidate answers. The filter data 116 may further include dependencies between different filters in the filters 115. For example, filter A may be dependent on filter B and the QA application 112 may store an association in the filter data 116 reflecting the dependency. Doing so allows the QA application 112 to ensure that filters having dependencies are ran together (in succession), or that only one filter is ran, to maintain the dependencies. The QA application 112 may detect dependencies between filters by any technique. For example, filter A may have 40% selectivity while filter B may have 50% selectivity. Via independence, the QA application 112 may compute the total selectivity to be 0.4*0.5=0.2, or 20%. However, in application, the QA application 112 may determine that the selectivity is only 0.03% because the data is not independent. In such a case, the QA application 112 would run filters A and B together in order to take advantage of the dependencies which lead to the filters to discard more candidate answers than they would if the filters processed candidate answers independently.

As previously discussed, the QA application 112 may identify optimal orderings of the filters 115. The QA application 112 may store these optimal orderings in the filters 115 and/or the filter data 116. Doing so allows the QA application 112 to save the optimal orderings for future re-use when processing other questions. In addition, the QA application 112 may store associations between the optimal orderings and one or more of a specific question, a class of questions, a corpus 114 used to process questions, and an instance of the QA application 112.

Figure 2:
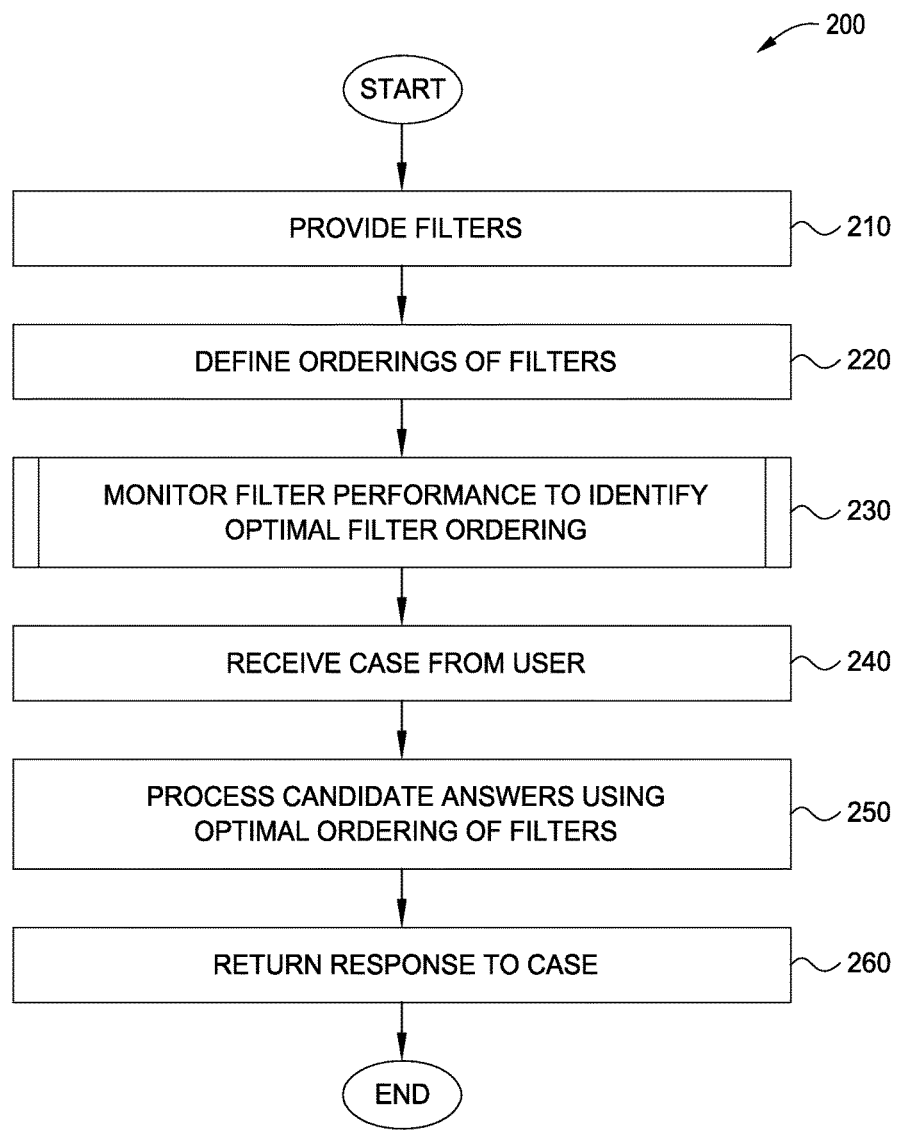
FIG. 2 illustrates a method to provide dynamic filter optimization in deep question answering systems, according to one embodiment.

FIG. 2 illustrates a method 200 to provide dynamic filter optimization in deep question answering systems, according to one embodiment. Generally, the steps of the method 200 allow a deep question answering system to intelligently order filters such that the amount of time required to filter candidate answers is minimized. In at least one aspect, the QA application 112 performs the steps of the method 200. The method 200 begins at step 210, where a plurality of filters are provided to the QA application 112. The filters may be stored in the filters 115. At step 220, a user (such as an application developer) or the QA application 112 may define orderings of the filters in the filters 115. The orderings may be specific to a question, a class of questions, the corpus of information being used to answer questions, and/or a particular instance of the QA application 112. At step 230, described in greater detail with reference to FIG. 3, the QA application 112 may monitor filter performance to identify an optimal filter ordering. Generally, the QA application 112 may monitor the performance of each set of filters applied to candidate answers generated in response to a case submitted by a user. Doing so may allow the QA application 112 to determine which ordering is the optimal ordering. At step 240, the QA application 112 may receive a case from a user. At step 250, the QA application 112 may process candidate answers generated for the case using the optimal ordering of filters identified at step 230. At block 260, the QA application 112 may return a response to the user.

Figure 3:
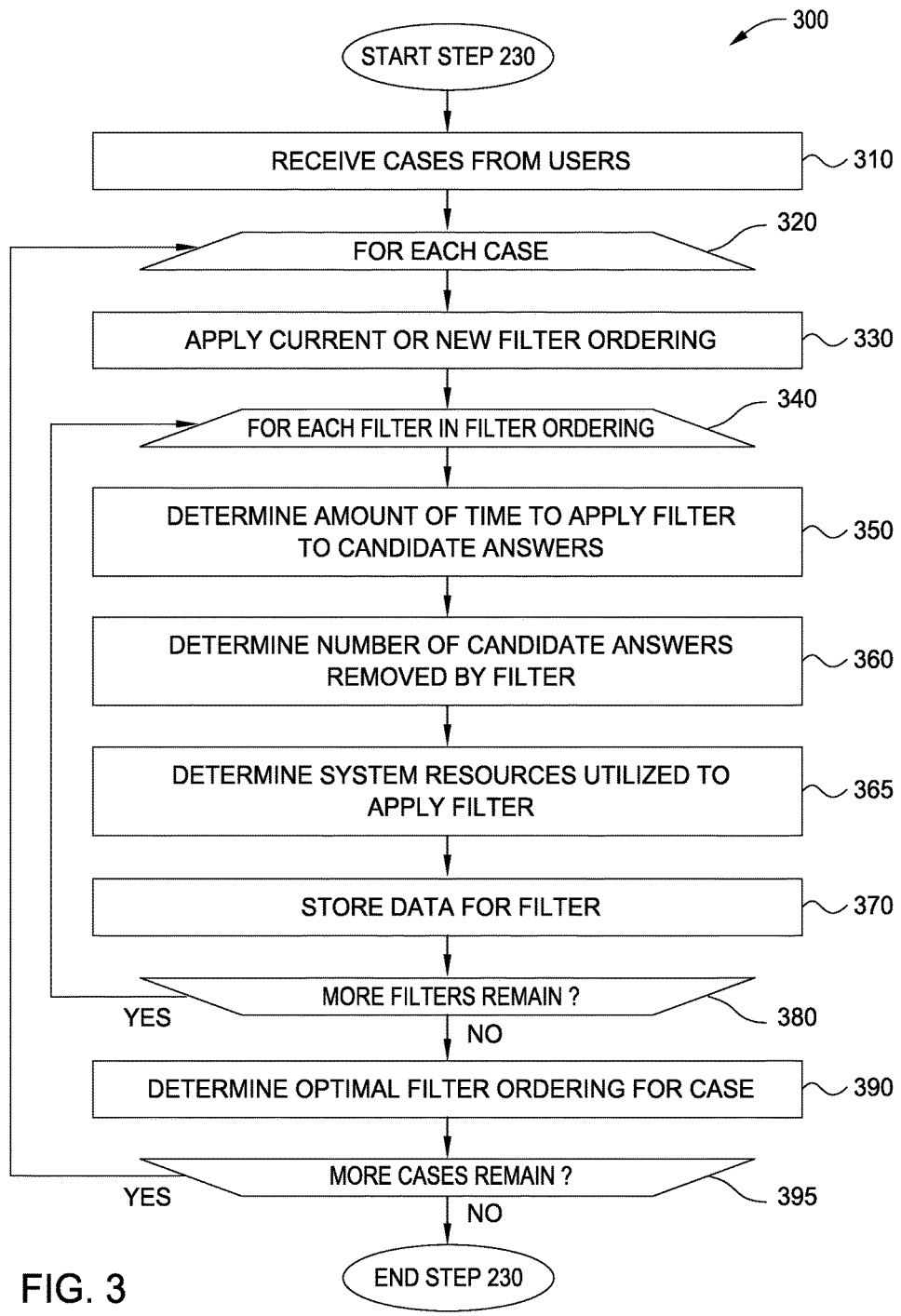
FIG. 3 illustrates a method to monitor filter performance to identify optimal filter ordering, according to one embodiment.

FIG. 3 illustrates a method 300 corresponding to step 230 to monitor filter performance to identify optimal filter ordering, according to one embodiment. Generally, the method 300 allows a deep question answering system to monitor the processing performance of different orderings of filters in the filters 115. In at least one embodiment, the QA application 112 performs the steps of the method 300. The QA application 112 may execute the steps of the method 300 for all cases, a subset of cases, or according to a predefined schedule for identifying optimal filter orderings.

The method 300 begins at step 310, where the QA application 112 receives cases from users. At step 320, the QA application 112 executes a loop including steps 330-395 for each case received by the QA application 112. In at least one aspect, however, the QA application 112 may perform the steps 330-395 for a subset of cases received from users. At step 330, the QA application 112 may identify the current filtering order used to filter candidate answer. In at least one embodiment, the filters 115 and/or the filter data 116 may specify the current order for applying filters to candidate answers. Alternatively, the QA application 112 may generate a new filtering order to apply to the case, such that all permutations (or a subset thereof) are applied to cases. Doing so allows the QA application 112 to test a greater number of filter orderings to identify the optimal filter ordering. In at least one embodiment, the QA application 112 includes a descriptor that defines the order of programs in an unstructured information management architecture (UIMA). UIMA provides the ability to call a compute module from the descriptor. As such, the QA application 112 may dynamically compute the order for the programs (which contain the filter code).

At step 340, the QA application 112 executes a loop including steps 350-380 for each filter in the current filtering order applied at 330. At step 350, the QA application 112 determines the amount of time required to apply the filter to the candidate answers generated by the QA application 112 for the current case. For example, the QA application 112 may determine that applying a first filter to each of 10 candidate answers took 10 seconds. At step 360, the QA application 112 determines the number of candidate answers removed by the current filter. For example, the QA application 112 may determine that applying the first filter to the 10 candidate answers removed 4 of the candidate answers and retained 6 of the candidate answers. At step 365, the QA application 112 may determine the amount of system resources utilized to apply the filter to the candidate answers. The system resources may include, without limitation, CPU cycles/time, RAM storage, disk storage, network bandwidth, number of IOs, number of threads, and the like. For example, the QA application 112 may determine that applying the first filter utilized 100% of available network bandwidth, while applying a second filter utilized 20% of network bandwidth. In such a case, the QA application 112 may create an ordering that places the second filter prior to the first filter, such that the first filter is applied to fewer candidate answers.

At step 370, the QA application 112 may store the data collected at steps 350, 360, and 370 to the filter data 116. At step 380, the QA application 112 may determine whether more filters in the filter ordering remain to be applied to the candidate answers. If more filters remain, the QA application 112 returns to step 340, where the QA application 112 applies the remaining filters to the remaining candidate answers. If no more filters remain, the QA application 112 proceeds to step 390.

At step 390, the QA application 112 may determine the optimal filter ordering for the current case. In at least one embodiment, the optimal filter ordering is the filter ordering that allowed all filters to process all candidate answers in the least amount of time. In another embodiment, the optimal filter ordering is the filter ordering that allowed all filters to process all candidate answers using the least amount of system resources. In still another embodiment, the QA application 112 may determine the optimal filter ordering based on two or more of the total time spent and system resources spent applying each filter to each candidate answer. For example, the QA application 112 may consider the amount of CPU and RAM utilized in a first embodiment, while considering time and network bandwidth utilized in a second embodiment. In at least one embodiment, rules stored in the filters 115 may specify which criteria the QA application 112 should apply in determining the optimal filter ordering. Based on these rules, the QA application 112 may determine which filter ordering consumed the least amount of resources and/or time.

The QA application 112 may store the identified optimal filter ordering in the filter orderings 116. The optimal filter ordering may be associated with one or more of the current case, a class of cases the current case belongs to, the corpus being leveraged by the QA application 112 to process the current case, or the instance of the QA application 112 processing the current case. At step 395, the QA application 112 may determine whether more cases remain for processing. If more cases remain, the QA application 112 may return to step 320. If no more cases remain during the monitoring phase, the method 300 ends.

Advantageously, embodiments disclosed herein optimize the order in which a deep question answering system applies filters to candidate answers when processing questions or cases received from users. By monitoring the amounts of time and/or system resources spent filtering candidate answers for a question using different permutations of filter order, the QA application 112 may identify the optimal filter ordering, and apply this ordering when processing future cases. Over time, the QA application 112 may continue to refine and update the optimal order, ensuring that the optimal order is used, even if the optimal order changes as time passes.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Reference has been made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the QA application 112 could execute on a computing system in the cloud and determine optimal filter orderings for processing questions received from users. In such a case, the QA application 112 could store the optimal orderings at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
providing a plurality of filters in a question answering (QA) system, wherein each of the filters is configured to remove candidate answers not meeting a set of criteria of each respective filter from further consideration by the QA system;
determining that a first ordering, of a plurality of orderings of the plurality of filters, utilizes a first amount of computing resources to apply each of the plurality of filters to remove candidate answers, wherein the computing resources comprise one or more of: (i) a processor, (ii) a memory, (iii) network bandwidth, (iv) disk storage, and (v) a number of processor threads;
determining that a second ordering, of the plurality of orderings of the plurality of filters, utilizes a second amount of computing resources to apply each of the filters to remove candidate answers;
determining that the first ordering is a more optimal ordering of the plurality of filters based on: (i) the first amount of computing resources being less than a respective amount of computing resources utilized to apply each of the plurality of filters in each ordering including the second ordering, (ii) a respective amount of time required to apply each of the plurality of filters in each ordering, and (iii) a respective number of candidate answers removed by applying a first set of filters according to each ordering; and
configuring the QA system to apply the plurality of filters to candidate answers according to the first ordering.

2. The method of claim 1, further comprising:
upon determining a second filter is dependent on a first filter, causing the second filter to immediately follow the first filter in the first ordering of the plurality of filters.

3. The method of claim 1, wherein determining that the first ordering is the more optimal ordering is further based on a historical set of computing resources used when applying the filters to candidate answers according to each of the plurality of orderings while processing questions received by the QA system.

4. The method of claim 1, further comprising:
processing, by the QA system, a first plurality of questions using the first ordering of the plurality of orderings of the plurality of filters;
processing, by the QA system, a second plurality of questions using the second ordering of the plurality of orderings of the plurality of filters;
determining that an amount of system resources used to filter candidate answers for the first plurality of questions using the first ordering is a threshold amount greater than an amount of system resources used to filter candidate answers for the second plurality of questions using the second ordering;
determining that the second ordering is the more optimal ordering of the plurality of filters based on the amount of resources used to filter candidate answers for the first plurality of questions being a threshold amount greater than the amount of resources used to filter candidate answers for the second plurality of questions and
configuring the QA system to apply the plurality of filters to candidate answers according to the second ordering.

5. The method of claim 1, wherein the QA system is configured to apply the first ordering to: (i) a question received by the QA system, (ii) a corpus of information used by the QA system to process questions, and (iii) a class of questions received by the QA system.

6. The method of claim 1, further comprising:
receiving, by the QA system, a first question from a user;
generating a plurality of candidate answers for the first question from a corpus of information; and
applying the plurality of filters to the plurality of candidate answers according to the first ordering of the plurality of filters.

7. A system, comprising:
one or more computer processors; and
a memory containing a program, which when executed by the processors, performs an operation comprising:
   providing a plurality of filters in a question answering (QA) system, wherein each of the filters is configured to remove candidate answers not meeting a set of criteria of each respective filter from further consideration by the QA system;
   determining that a first ordering, of a plurality of orderings of the plurality of filters, utilizes a first amount of computing resources to apply each of the plurality of filters to remove candidate answers, wherein the computing resources comprise one or more of: (i) a processor, (ii) a memory, (iii) network bandwidth, (iv) disk storage, and (v) a number of processor threads;
   determining that a second ordering, of the plurality of orderings of the plurality of filters, utilizes a second amount of computing resources to apply each of the filters to remove candidate answers;
   determining that the first ordering is a more optimal ordering of the plurality of filters based on: (i) the first amount of computing resources being less than a respective amount of computing resources utilized to apply each of the plurality of filters in each ordering including the second ordering, (ii) a respective amount of time required to apply each of the plurality of filters in each ordering, and (iii) a respective number of candidate answers removed by applying a first set of filters according to each ordering; and
   configuring the QA system to apply the plurality of filters to candidate answers according to the first ordering.

8. The system of claim 7, the operation further comprising:
   upon determining a second filter is dependent on a first filter, causing the second filter to immediately follow the first filter in the first ordering of the plurality of filters.

9. The system of claim 7, wherein determining that the first ordering is the more optimal ordering is further based on a historical set of computing resources used when applying the filters to candidate answers according to each of the plurality of orderings while processing questions received by the QA system.

10. The system of claim 7, the operation further comprising:
   processing, by the QA system, a first plurality of questions using the first ordering of the plurality of orderings of the plurality of filters;
   processing, by the QA system, a second plurality of questions using the second ordering of the plurality of orderings of the plurality of filters;
   determining that an amount of system resources used to filter candidate answers for the first plurality of questions using the first ordering is a threshold amount greater than an amount of system resources used to filter candidate answers for the second plurality of questions using the second ordering;
   determining that the second ordering is the more optimal ordering of the plurality of filters based on the amount of resources used to filter candidate answers for the first plurality of questions being a threshold amount greater than the amount of resources used to filter candidate answers for the second plurality of questions; and
   configuring the QA system to apply the plurality of filters to candidate answers according to the second ordering.

11. The system of claim 7, wherein the QA system is configured to apply the first ordering to: (i) a question received by the QA system, (ii) a corpus of information used by the QA system to process questions, and (iii) a class of questions received by the QA system.

12. The system of claim 7, the operation further comprising:
   receiving, by the QA system, a first question from a user;
   generating a plurality of candidate answers for the first question; and
   applying the plurality of filters to the plurality of candidate answers according to the first ordering of the plurality of filters.

13. A computer program product, comprising:
a non-transitory computer-readable storage medium having computer-readable program code embodied therewith, the computer-readable program code executable by a processor to perform an operation comprising:
   providing a plurality of filters in a question answering (QA) system, wherein each of the filters is configured to remove candidate answers not meeting a set of criteria of each respective filter from further consideration by the QA system;
   determining that a first ordering, of a plurality of orderings of the plurality of filters, utilizes a first amount of computing resources to apply each of the plurality of filters to remove candidate answers, wherein the computing resources comprise one or more of: (i) a processor, (ii) a memory, (iii) network bandwidth, (iv) disk storage, and (v) a number of processor threads;
   determining that a second ordering, of the plurality of orderings of the plurality of filters, utilizes a second amount of computing resources to apply each of the filters to remove candidate answers;
   determining that the first ordering is a more optimal ordering of the plurality of filters based on: (i) the first amount of computing resources being less than a respective amount of computing resources utilized to apply each of the plurality of filters in each ordering including the second ordering, (ii) a respective amount of time required to apply each of the plurality of filters in each ordering, and (iii) a respective number of candidate answers removed by applying a first set of filters according to each ordering; and
   configuring the QA system to apply the plurality of filters to candidate answers according to the first ordering.

14. The computer program product of claim 13, the operation further comprising:
   upon determining a second filter is dependent on a first filter, causing the second filter to immediately follow the first filter in the first ordering of the plurality of filters.

15. The computer program product of claim 13, wherein determining that the first ordering is the more optimal ordering is further based on a historical set of computing resources used when applying the filters to candidate answers according to each of the plurality of orderings while processing questions received by the QA system.

16. The computer program product of claim 13, the operation further comprising:
   processing, by the QA system, a first plurality of questions using the first ordering of the plurality of orderings of the plurality of filters;

processing, by the QA system, a second plurality of questions using the second ordering of the plurality of orderings of the plurality of filters;

determining that an amount of system resources used to filter candidate answers for the first plurality of questions using the first ordering is a threshold amount greater than an amount of system resources used to filter candidate answers for the second plurality of questions using the second ordering;

determining that the second ordering, is the more optimal ordering of the plurality of filters based on the amount of resources used to filter candidate answers for the first plurality of questions being a threshold amount greater than the amount of resources used to filter candidate answers for the second plurality of questions; and causing the QA system to apply the plurality of filters to candidate answers according to the second ordering.

17. The computer program product of claim 13, wherein the QA system is configured to apply the first ordering to: (i) a question received by the QA system, (ii) a corpus of information used by the QA system to process questions, and (iii) a class of questions received by the QA system, the operation further comprising:

receiving, by the QA system, a first question from a user;

generating a plurality of candidate answers for the first question from a corpus of information; and applying the plurality of filters to the plurality of candidate answers according to the first ordering of the plurality of filters.

* * * * *